United States Patent [19]

Dara et al.

[11] Patent Number: 5,012,168
[45] Date of Patent: Apr. 30, 1991

[54] METHOD AND APPARATUS FOR DETECTING STALL CURRENT IN AN ENERGIZED ELECTRIC MOTOR

[75] Inventors: Paul C. Dara, Warren; Clair E. Mitchell, Detroit; David J. Rutkowski, Grosse Ile, all of Mich.

[73] Assignee: Ford Motor Company, Dearborn, Mich.

[21] Appl. No.: 481,921

[22] Filed: Feb. 20, 1990

[51] Int. Cl.[5] .............................................. H02H 3/08
[52] U.S. Cl. ...................... 318/434; 361/24; 318/471
[58] Field of Search ............... 318/432, 434, 466, 469, 318/471, 472, 473, 456; 361/23, 24, 28, 30, 31, 103

[56] References Cited

U.S. PATENT DOCUMENTS

| | | | |
|---|---|---|---|
| 3,974,422 | 8/1976 | Konig | 318/469 X |
| 4,394,607 | 7/1983 | Lemirande | 318/471 X |
| 4,432,031 | 2/1984 | Premerlani | 361/94 X |
| 4,433,274 | 2/1984 | Duhame | 318/471 X |
| 4,455,012 | 6/1984 | Gupta | 251/134 |
| 4,468,599 | 8/1984 | Bergan et al. | 318/434 X |
| 4,509,088 | 4/1985 | Profio | 361/29 |
| 4,581,711 | 4/1986 | Hirata et al. | 318/434 X |
| 4,628,234 | 12/1986 | Mizuta et al. | 318/267 |
| 4,641,067 | 2/1987 | Iizawa et al. | 318/287 |
| 4,659,976 | 4/1987 | Johnson | 318/434 X |
| 4,725,765 | 2/1988 | Miller | 318/434 |
| 4,746,845 | 5/1988 | Mizuta et al. | 318/286 |
| 4,779,031 | 10/1988 | Arendo et al. | 318/434 X |
| 4,796,142 | 1/1989 | Libert | 361/23 |
| 4,878,004 | 10/1989 | Shimizu | 318/434 X |

Primary Examiner—William M. Shoop, Jr.
Assistant Examiner—A. Jonathan Wysocki
Attorney, Agent, or Firm—Paul K. Godwin, Jr.; Clifford L. Sadler

[57] ABSTRACT

Stall current levels are determined according to measured peak currents occurring immediately after the energization of a motor. By utilizing a fractional value of the determined peak current value, the stall current is determined each time the motor is energized to compensate for variations in current flowing in a motor at different ambient temperatures.

27 Claims, 3 Drawing Sheets

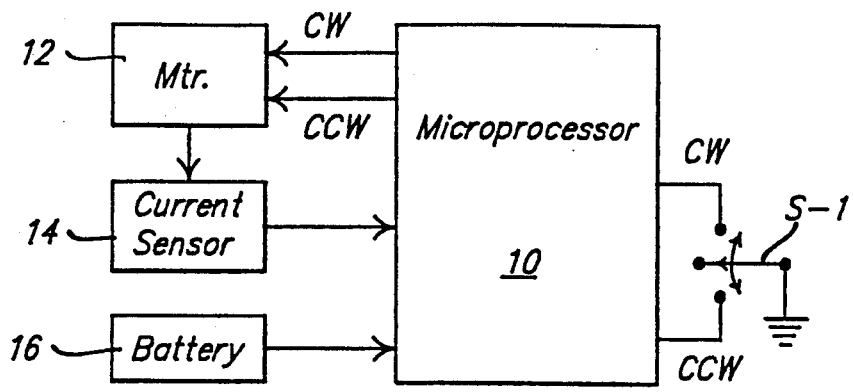
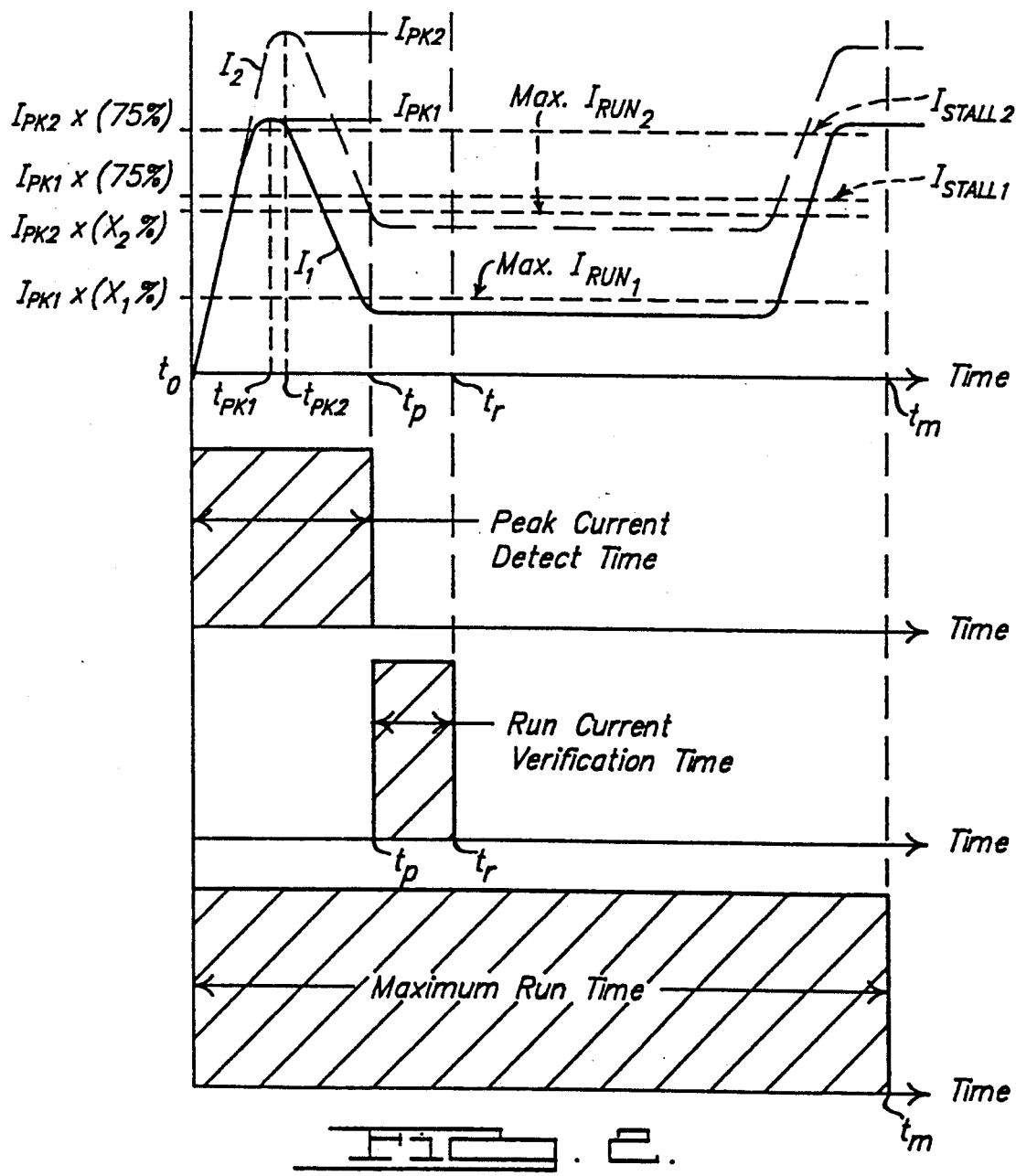

METHOD AND APPARATUS FOR DETECTING STALL CURRENT IN AN ENERGIZED ELECTRIC MOTOR

BACKGROUND OF THE INVENTION

1. Field of the Invention

The present invention is directed to the field of control for electric motors and, more specifically, to the area of motor protection by detecting excessive current due to stalling in such motors.

2. Description of the Prior Art

Various solutions have been proposed in the past for limiting the effects of excessive currents in electric motors and associated control circuitry. In the automotive environment, such motors are usually energized with DC voltage to provide limited range movement of windows or seats. Stalling may occur when the mechanism driven by the motor reaches the end of its travel path or is otherwise prevented from moving. At such a point, a motor will draw excessive current that can cause damage to not only the motor but the switching circuitry that supplies current to the motor.

In commonly assigned U.S. Pat. No. 4,725,765 (incorporated herein by reference) a circuit is described for detecting the stall current in a DC motor and inhibiting the application of DC voltage to the motor for a predetermined period of time. In the '765 patent, it is recognized that the current drawn by the motor immediately, upon start-up, peaks at a high level with respect to the current drawn by the motor during its subsequent run condition. At stall, the power supplied to the motor is inhibited for predetermined periods of time to reduce the effects of the stall current on the motor. The system described in the '765 patent looks for a stall current level that is continuous for a period of time greater than that which occurs during the start-up period, in order to distinguish the two.

In most prior art attempts to address the problem of detecting stall currents, certain assumptions are made as to the magnitude of the stall current level. However, it has been found that the current draw characteristics of motors and associated linkages tend to vary one to another and over time. In addition, motors are temperature sensitive and tend to draw more current at low temperatures.

SUMMARY OF THE INVENTION

It is an object of the present invention to provide a method and apparatus which senses the peak start-up current of a motor and uses that information to determine a stall current reference value and to terminate the application of power to the associated motor when the current drawn by the motor exceeds the stall current reference value.

It is another object of the present invention to provide a method and apparatus whereby an initial start time period of motor energization is used to analyze the start-up current to determine a peak current value, and an acceptable run current value for that motor is determined by the peak current value.

It is another object of the present invention to provide a method and apparatus whereby motor current is sampled during a first predetermined period of time commencing with the start of a motor to determine a peak current value and an acceptable run current value, and sampling occurs over a second predetermined period of time immediately following the first period of time to determine if the average current has dropped to an acceptable run current value during that latter period.

It is a further object of the present invention to provide a method and apparatus for controlling the energization of an electric motor by limiting the time that the motor can be energized.

It is a still further object of the present invention to provide a method of detecting stall current in an electric motor by the appropriate programming of a microprocessor or other computer device.

The present invention is intended for use in those applications where the current of an electric motor must be turned off once the motor shaft movement has been stopped by some physical means of restraint, either by design or by fault. It applies to the control of both linear and rotative motors. In the event of such stopping, the motor current increases rapidly to a value much greater than that drawn when the motor is in its normal runn condition. That stopped condition is called "stall", and the current flowing at that time is called "stall current". Motors are designed to withstand such level of current flow for limited periods of time, consistent with normal operation. However, if the stall current is allowed to flow for an extended time, motor burn-out can occur. When a DC motor is first energized from a DC voltage source, the current in the motor is limited only by the source capacity and DC resistance of the armature winding. As such, the current initially reaches a value equal to the voltage across the armature divided by its resistance. This current is known as the starting current and is in the form of a sharply rising pulse that reaches a peak value. As the armature begins to rotate due to field reaction in the motor, an electromagnetic field (emf) is induced into the armature windings The induced emf is caused by the armature movement through the magnetic field provided by field poles surrounding the armature. The induced emf has a polarity opposite that of the voltage impressed upon the armature by the DC voltage source. The opposing emf acts to reduce the current in the motor armature and to increase that effect as armature speed increases. Once the motor has reached its normal running speed, the current drawn by the motor is at a relatively low level. When the armature of the motor is restrained from rotation (stopped), the armature current will increase to a level that approaches the start peak current value. Stall current reference values must be determined in order to protect the motor from the effects of these high currents. The currents drawn by the motor are determined by the supply voltage, the motor winding resistance, and motor speed response characteristics (load). In all regions of motor operation, the motor current is also a function of the motor temperature since motor windings have a positive temperature coefficient of resistance. Motor temperature is dependent upon either self-heating or ambient temperature.

The unique features of the present invention allow for accurate control of the motor with regard to excessive currents while compensating for variations in motor currents due to temperature changes and other effects. In order to minimize the effects of those current variations on the sensing of stall current, the present invention periodically samples the current drawn by the motor during an initial time period immediately following energization of the motor. A peak current value is determined based upon an average of a plurality of the highest samples taken during that initial period. Subsequently, a fractional value of the peak current value (approximately 75% in the described embodiment) is used as a stall current reference value against which subsequent current samplings are compared. This calculation of peak current value is made every time the motor is turned on. Therefore, if the motor is in an extremely cold environment, the peak current value and run current value may be higher than if the motor were in a warmer environment. The stall current reference value for each operation of the motor is determined based upon the correspondingly calculated peak current value.

In order to verify that the current returns to an acceptable value after the initial start period, a second predetermined period of time is provided, immediately following the initial start period, over which periodic samplings of the motor current are made. Based upon the peak current value determined during that initial start period, a fractional factor is provided (in a look-up table or by logic code circuitry). The peak current value is multiplied by the fractional factor to determine a maximum run current reference value. The current sample values are averaged over a plurality of the most recently sampled values, and at the end of the second period of time an average run current value is derived and compared with the maximum run current reference value to verify that the current has returned to an acceptable level during operation of the motor. If the average run current remains above the maximum run current reference value, energization of the motor is terminated.

BRIEF DESCRIPTION OF THE DRAWINGS

FIG. 1 is a block diagram of an apparatus embodying the present invention.

FIG. 2 comprises a combination of waveform and timing diagrams that are used to describe the present invention.

DETAILED DESCRIPTION OF THE PREFERRED EMBODIMENT

Figure 3A:
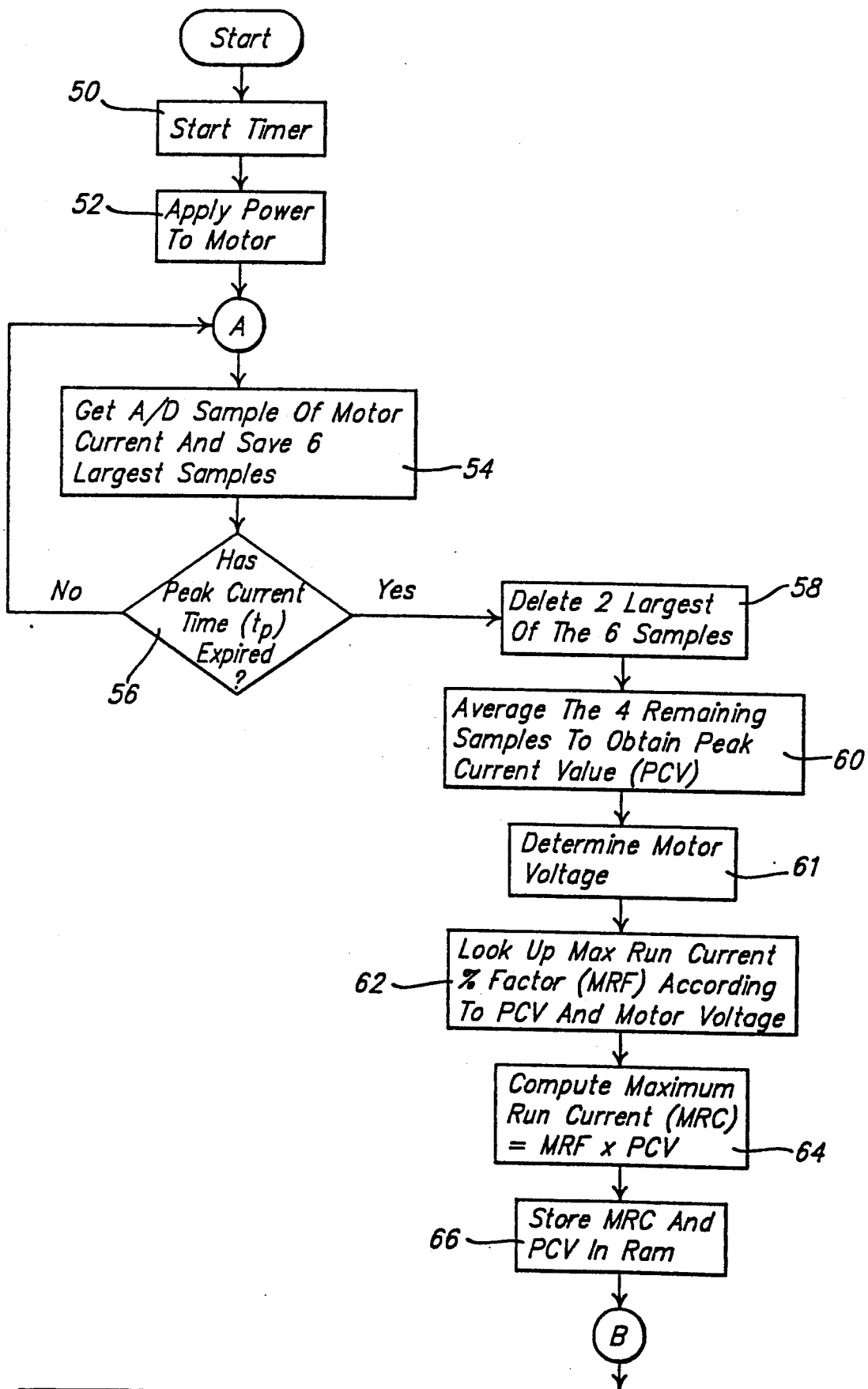
FIG. 3 is a flow chart which is used to describe the method steps of the present invention.

FIG. 1 is a basic block diagram representing components utilized in the present invention.

A bidirectional DC motor 12 is controlled by a microprocessor 10. Microprocessor 10 is connected to a source of DC voltage such as a battery 16. A switch S-1 is manually controlled to select which of the two directions the motor 12 is driven. In this case, the directions are indicated as clockwise (CW) and counter clockwise (CCW). A current sensor circuit 14 is connected between the motor 12 and the microprocessor 10. The current sensor is a conventional type in which a resistor is placed in series with the drive voltage to the motor and the voltage across that resistor is sensed. The microprocessor 10 includes an analog to digital (A/D) converter so that a digital representation of the value of current being drawn by the motor can be determined. In this embodiment, the microprocessor 10 controls the application of the current to the motor in response to the setting of the manual switch S-1 and will also deenergize the motor when appropriate.

In FIG. 2, the upper waveform diagram illustrates two current plots, $I_1$ (solid line) and $I_2$ (broken line) which represent the measured currents drawn by an energized motor at a relatively high ambient temperature and at a relatively low ambient temperature respectively. For plot $I_1$, taken at a relatively high temperature, upon energization of the motor at time $t_0$ the current surges in the motor to a relatively high level $I_{PK1}$ at a time $t_{PK1}$ when the motor is at a lower temperature, the plot $I_2$ shows the peak current value $I_{PK2}$ immediately after start up at time $t_{PK2}$ is higher than $I_{PK1}$ and takes a comparatively longer time to reach that peak.

Since all motors of this type tend to reach a start peak shortly after being energized at $t_0$, a peak current value detect time $t_p$ is designated as the initial start period in which a peak current value may be detected. After the current of the motor reaches its peak, the motor begins to turn (run) and the counter emf produced in the windings of the motor cause the current drawn by the motor to be reduced to a relatively low level as compared to the peak current value. It can be seen from the two current plots $I_1$ and $I_2$ illustrated in FIG. 2 that depending upon the temperature of the motor, the measured currents can be at significantly different values. In order to provide a reliable and accurate control, a stall current reference level is determined based upon the value of the peak current value occurring within the peak current value detect time $t_p$. In the present invention, the stall current reference value is calculated as being approximately 75% of the determined peak current value. Therefore in the case of the current plot $I_1$, the $I_{STALL\ 1}$ current reference value is shown as being equal to $75\% I_{PK1}$. For the current plot $I_2$, the stall current reference value is represented as $I_{STALL\ 2}$ and is equal to $75\% I_{PK2}$.

The current drawn by the motor, subsequent to the peak current value detect time $t_p$, is periodically sampled until such time as the current is detected as being in excess of the calculated stall current reference value.

There are some occasions when the motor is energized and, due to jamming or being positioned at the end of its movement range, the current does not return from its peak level to an acceptable run current value after the initial start period. Accordingly, in the present invention, a run current detect time period is allotted after the peak current detect time period in which a determination is made regarding whether the current drawn by the motor has returned to an acceptable average run current value. During the run current detect time period, the current is periodically sampled, averaged and compared with a maximum run current reference value. The maximum run current reference value is determined according to the most recently determined peak current value. A maximum run current value is the product of a fractional factor multiplied by the determined peak current value. Fractional factors are predetermined based upon empirical results. When utilizing a microprocessor such as shown in FIG. 1, the fractional factors for use in calculating the maximum run current reference values can be stored in a look up table and are accessible according to the determined peak current value.

In addition to sampling current values and comparing those values to predetermined reference values, a maximum run time $t_m$ is provided. The motor is automatically deenergized if it is continuously run for a period of time which exceeds the maximum run time $t_m$. This is intended to prevent prolonged energization of the motor in those environments where the only reason for such prolonged energization is due to some fault in the system.

If the current average sensed during the run current detect time period is verified as being above the maximum run current reference value, the motor is immediately deenergized because the current did not return to an acceptable run current value.

Figure 3B:
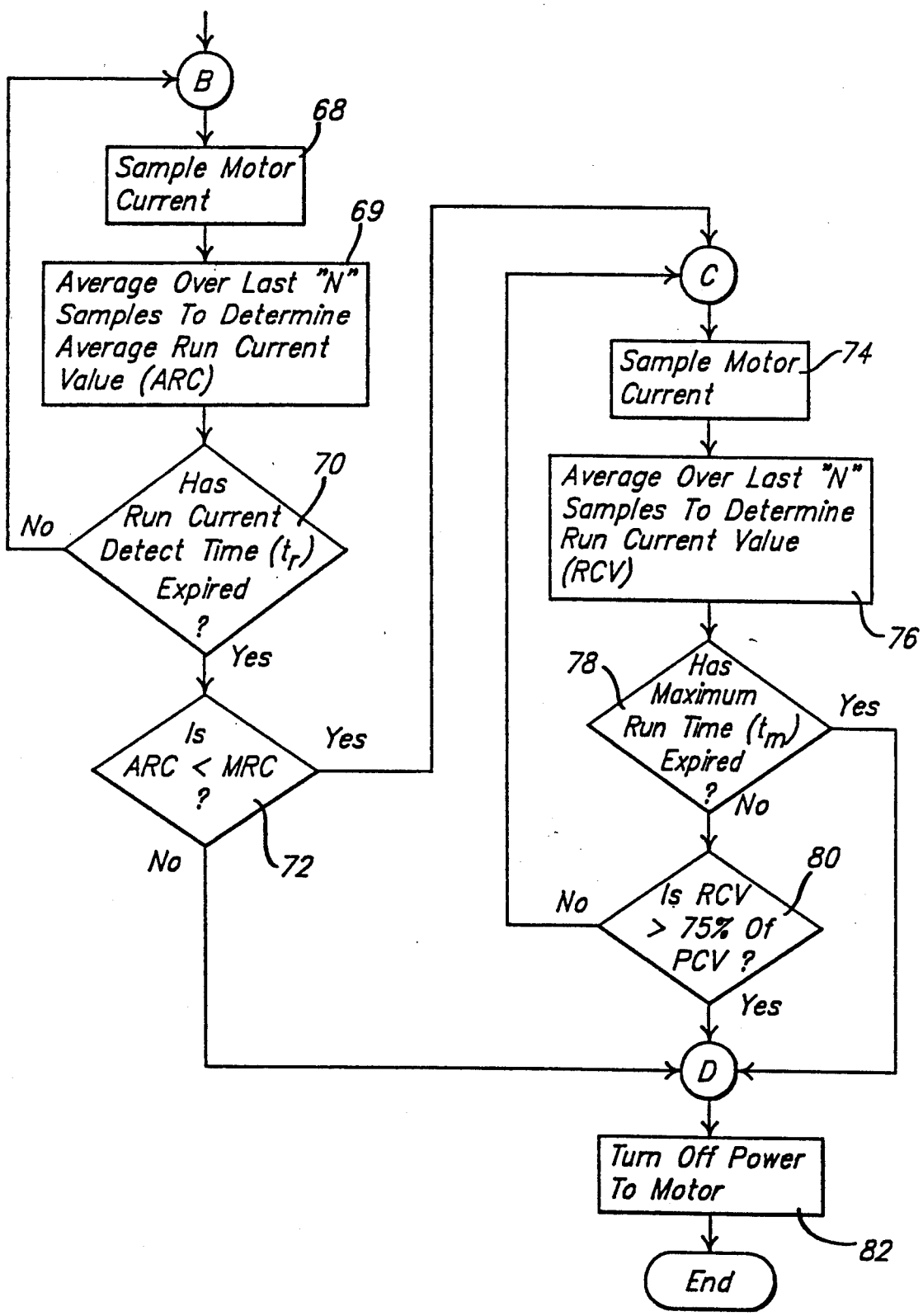

The flow chart in FIG. 3 is used to describe the steps of the method and as programmed into the microprocessor 10. Upon depression of the switch S-1, the program is started and a timer is started in instruction 50. DC power is applied to the motor in step 52. The motor current is repeatedly sampled at step 54 until such time as the peak current detect time $t_p$ has expired and determined by step 56. During the peak current detect time period, step 54 is repeated and the six largest samples of motor current value are stored. After the peak current detect time $t_p$ has expired, step 58 requires that the two largest of the six samples be deleted to safeguard against erroneous values of current measurements during the period. The four remaining samples are averaged in step 60 to obtain the peak current value (PCV). In step 61, the motor voltage is determined and that value is stored. The maximum run current fractional factor (MRF) is obtained in step 62 from a look up table according to the values of PCV determined in step 60 and the motor voltage value determined in step 61. When the MRF is retrieved from the look up table, it is used to compute the maximum run current reference value (MRC) in step 64. The calculation is the result of multiplying the PCV by the MRF. The derived values of the MRC and PCV are stored in RAM in step 66. The motor current is sampled in step 68 and averaged over the last "N" samples in step 69. Steps 68 and 69 are periodically repeated as long as the run current verification time $t_r$ has not expired, as determined by step 70. Once the verification time $t_r$ has expired, the average run current value (ARC) is compared in step 72 with the MRC stored in RAM. If the ARC is not less than the MRC, the system progresses to junction D where the motor is deenergized in step 82. On the other hand, if the determination made in step 72 is that the ARC is less than the MRC, the motor current is deemed to have returned to an acceptable run current value and it is sampled at step 74. The motor current sampled at step 74 is averaged over the last "N" samples to determine a run current value (RCV) in step 76.

An inquiry is made in step 78 to determine if the maximum run time $t_m$ has expired. If the maximum run time $t_m$ has expired, the system progresses to junction D and step 82 where the motor is deenergized. If step 78 determines that the maximum run time period has not expired, the RCV is compared with a fractional value of PCV stored in RAM. This comparison is made in step 80 where 75% is the fractional factor used in conjunction with the PCV to determine the stall current reference value. If the RCV remains less than the stall current reference value as determined in step 80, the program returns to junction C and the motor current is again sampled in 74 and averaged in step 76. The periodic repetition of the subroutine defined by steps 74, 76, 78 and 80 continues until either the maximum run time $t_m$ has expired or the RCV exceeds the stall current reference value. When either event occurs, the motor is then deenergized and the program is terminated at step 82.

The foregoing discusses both method and apparatus for detecting stall current in an energized motor. While the implementation of the invention is described as using a microprocessor that is appropriately programmed to perform method steps, it is forseen that the invention could also be implemented in the form of hardwired logic circuitry which performs sample and hold functions to the current levels sampled during the peak current detect time period.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A method of detecting stall current in an energized electric motor, comprising the steps of:
    energizing said motor;
    periodically sampling the current drawn by said motor during a first predetermined period of time immediately following the commencement of the energizing step;
    determining a peak current value from said samplings for said first predetermined period of time;
    multiplying said determined peak current value by a first predetermined fraction to derive a stall current reference value;
    continuing to periodically sample said current drawn by said motor during the time it is energized to determine run current values;
    comparing each run current value with said stall current reference value; and
    deenergizing said motor when said compared run current values exceed said stall current reference value.

2. A method as in claim 1, wherein said step of determining said peak current value includes the steps of identifying a predetermined number of the highest value of said samplings and averaging a plurality of those values to determine said peak current value.

3. A method as in claim 2, wherein said step of determining said run current value includes the step of averaging a predetermined number of the most recent previous samplings.

4. A method as in claim 3, wherein said step of determining the peak current value is performed each time said motor is energized.

5. A method as in claim 4, further including the steps of:
    defining a run current verification period of time immediately following said first predetermined period of time;
    providing a second predetermined fraction value according to the value of said peak current value;
    multiplying said peak current value by said second predetermined fraction value to determine a maximum run current reference value;
    comparing each run current value with said maximum run current reference value, during said run current verification period, to verify that the run current has dropped below said maximum run current reference value; and
    deenergizing said motor if the average run current value is determined to be above the maximum run current reference value during said second predetermined period of time.

6. A method as in claim 5, further including the steps of:
    defining a maximum allowable time period that said motor is allowed to remain continuously energized;

measuring the time said motor is continuously energized;

periodically comparing the time said motor is continuously energized with said maximum allowable time period; and deenergizing said motor when a time comparison step indicates said motor has been continuously energized for a period of time that is greater than said maximum allowable time period.

7. A method of detecting stall current in an energized electric motor, comprising the steps of:

energizing said motor;

periodically sampling the current drawn by said motor during a first predetermined period of time immediately following the commencement of the energizing step;

determining a peak current value from said samplings for said first predetermined period of time;

multiplying said determined peak current value by a first predetermined fraction to derive a stall current reference value;

continuing to periodically sample said current drawn by said motor during the time it is energized to determine run current values;

defining a run current verification period of time immediately following said first predetermined period of time;

providing a second predetermined fraction value according to the value of said peak current value;

multiplying said peak current value by said second predetermined fraction value to determine a maximum run current reference value;

comparing each run current value with said maximum run current reference value, during said run current verification period, to verify that the run current has dropped below said maximum run current reference value;

deenergizing said motor if the run current value is determined to be above the maximum run current reference value during said second predetermined period of time;

comparing each run current value with said stall current reference value for the remainder of time said motor is energized; and deenergizing said motor when said compared run current values exceed said stall current reference value.

8. A method of detecting stall current in an energized electric motor, comprising the steps of:

energizing said motor;

periodically sampling the current drawn by said motor during a first predetermined period of time immediately following the commencement of the energizing step;

identifying a predetermined number of the highest value of said samplings;

averaging a plurality of said highest values to determine a peak current value for said first predetermined period of time;

multiplying said determined peak current value by a first predetermined fraction to derive a stall current reference value;

continuing to periodically sample said current drawn by said motor during the time it is energized to determine run current values;

defining a run current verification period of time immediately following said first predetermined period of time;

providing a second predetermined fraction value according to the value of said peak current value;

multiplying said peak current value by said second predetermined fraction value to determine a maximum run current reference value;

comparing each run current value with said maximum run current reference value, during said run current verification period, to verify that the run current has dropped below said maximum run current reference value;

deenergizing said motor if the run current value is determined to be above the maximum run current reference value during said second predetermined period of time;

comparing each run current value with said stall current reference value for the remainder of time said motor is energized; and deenergizing said motor when said compared run current values exceed said stall current reference value.

9. A method of detecting stall current in an energized electric motor, comprising the steps of:

energizing said motor;

periodically sampling the current drawn by said motor during a first predetermined period of time immediately following the commencement of the energizing step;

determining a peak current value from said samplings for said first predetermined period of time;

multiplying said determined peak current value by a first predetermined fraction to derive a stall current reference value;

continuing to periodically sample said current drawn by said motor during the time it is energized to determine run current values;

establishing a maximum allowable time period that said motor is allowed to remain continuously energized;

comparing each run current value with said stall current reference value;

deenergizing said motor when said compared run current values exceed said stall current reference value measuring the time said motor is continuously energized;

periodically comparing the time said motor is continuously energized with said maximum allowable time period; and deenergizing said motor when a time comparison step indicates said motor has been continuously energized for a period of time that is greater than said maximum allowable time period.

10. An apparatus for detecting stall current in an energized electric motor, comprising:

means for energizing said motor;

means for periodically sampling the current drawn by said motor during a first predetermined period of time immediately following the commencement of the energizing said motor;

means for determining a peak current value from said samplings for said first predetermined period of time;

means for multiplying said peak current value by a first predetermined fraction to derive a stall current reference value;

means for continuing to periodically sample said current drawn by said motor during the time it is energized to determine run current values;

means for comparing each run current value with said stall current reference value; and means for deenergizing said motor when said stall current comparing means indicates said compared run current values exceed said stall current reference value.

11. An apparatus as in claim 10, wherein said means for determining said peak current value identifies a predetermined number of the highest value of said samplings and averages a plurality of those values to determine said peak current value.

12. An apparatus as in claim 11, wherein said means for determining said run current value averages a predetermined number of the most recent previous samplings.

13. A method as in claim 12, wherein said means for determining the peak current value performs that function each time said motor is energized.

14. An apparatus as in claim 13, further including:

means for defining a run current verification period of time immediately following said first predetermined period of time;

means for providing a second predetermined fraction value according to the value of said peak current value;

means for multiplying said peak current value by said second predetermined fraction value to determine a maximum run current reference value;

means for comparing each run current value with said maximum run current reference value, during said run current verification period, to verify that the run current has dropped below said maximum run current reference value; and means for deenergizing said motor when said maximum run current comparing means indicates the run current value is above the maximum run current reference value during said second predetermined period of time.

15. An apparatus as in claim 14, further including:

means for defining a maximum allowable time period that said motor is allowed to remain continuously energized;

means for measuring the time said motor is continuously energized;

means for periodically comparing the time said motor is continuously energized with said maximum allowable time period; and means for deenergizing said motor when a time comparison step indicates said motor has been continuously energized for a period of time that is greater than said maximum allowable time period.

16. An apparatus for detecting stall current in an energized electric motor, comprising:

means for energizing said motor;

means for periodically sampling the current drawn by said motor during a first predetermined period of time immediately following the commencement of the energizing step;

means for determining a peak current value from said samplings for said first predetermined period of time;

means for multiplying said peak current value by a first predetermined fraction to derive a stall current reference value;

means for continuing to periodically sample said current drawn by said motor during the time it is energized to determine run current values;

means for defining a run current verification period of time immediately following said first predetermined period of time;

means for providing a second predetermined fraction value according to the value of said peak current value;

means for multiplying said peak current value by said second predetermined fraction value to determine a maximum run current reference value;

means for comparing each run current value with said maximum run current reference value, during said run current verification period, to verify that the run current has dropped below said maximum run current reference value;

means for deenergizing said motor if the run current value is determined by said maximum run current comparing means to be above the maximum run current reference value during said second predetermined period of time;

means for comparing each run current value with said stall current reference value for the remainder of time said motor is energized; and means for deenergizing said motor when said stall current comparing means indicates said run current values exceed said stall current reference value.

17. An apparatus for detecting stall current in an energized electric motor, comprising:

means for energizing said motor;

means for periodically sampling the current drawn by said motor during a first predetermined period of time immediately following the commencement of the energizing of said motor;

means for identifying a predetermined number of the highest value of said samplings;

means for averaging a plurality of said highest values to determine a peak current value for said first predetermined period of time;

means for multiplying said peak current value by a first predetermined fraction to derive a stall current reference value;

means for continuing to periodically sample said current drawn by said motor during the time it is energized to determine run current values;

means for defining a run current verification period of time immediately following said first predetermined period of time;

means for providing a second predetermined fraction value according to the value of said peak current value;

means for multiplying said peak current value by said second predetermined fraction value to determine a maximum run current reference value;

means for comparing each run current value with said maximum run current reference value, during said run current verification period, to verify that the run current has dropped below said maximum run current reference value;

means for deenergizing said motor if the run current value is determined by said maximum run current comparing means to be above the maximum run current reference value during said second predetermined period of time;

means for comparing each run current value with said stall current reference value for the remainder of time said motor is energized; and means for deenergizing said motor when said stall current means indicates said run current values exceed said stall current reference value.

18. An apparatus of detecting stall current in an energized electric motor, comprising:
    means for energizing said motor;
    means for periodically sampling the current drawn by said motor during a first predetermined period of time immediately following the commencement of the energizing of said motor;
    means for determining a peak current value from said samplings for said first predetermined period of time;
    means for multiplying said peak current value by a first predetermined fraction to derive a stall current reference value;
    means for continuing to periodically sample said current drawn by said motor during the time it is energized to determine run current values;
    means for defining a maximum allowable time period that said motor is allowed to remain continuously energized;
    means for comparing each run current value with said stall current reference value;
    means for deenergizing said motor when said stall current comparing means indicates said run current values exceed said stall current reference value
    means for measuring the time said motor is continuously energized;
    means for periodically comparing the time said motor is continuously energized with said maximum allowable time period; and
    means for deenergizing said motor when said time comparing means indicates said motor has been continuously energized for a period of time that is greater than said maximum allowable time period.

19. A system for detecting stall current in an energized electric motor, comprising:
    means for electrically energizing said motor;
    means for measuring the current drawn by said motor; and
    electronic comparater means programmed to perform the steps of:
    periodically sampling, the current measuring means during a first predetermined period of time immediately following the commencement of energizing said motor;
    determining a peak current value from said samplings for said first predetermined period of time;
    multiplying said determined peak current value by a first predetermined fraction to derive a stall current reference value;
    continuing to periodically sample said current drawn by said motor during the time it is energized to determine run current values;
    comparing each run current value with said stall current reference value; and
    deenergizing said motor when said compared run current values exceed said stall current reference value.

20. A system as in claim 19, wherein said program step of determining said peak current value includes the steps of identifying a predetermined number of the highest value of said samplings and averaging a plurality of those values to determine said peak current value.

21. A system as in claim 20, wherein said program step of determining said run current value includes the step of averaging a predetermined number of the most recent previous samplings.

22. A system as in claim 21, wherein said program step of determining the peak current value is performed each time said motor is energized.

23. A system as in claim 22, further including the program steps of:
    defining a run current verification period of time immediately following said first predetermined period of time;
    providing a second predetermined fraction value according to the value of said peak current value;
    multiplying said peak current value by said second predetermined fraction value to determine a maximum run current reference value;
    comparing each run current value with said maximum run current reference value, during said run current verification period, to verify that the run current has dropped below said maximum run current reference value; and
    deenergizing said motor if the average run current value is determined to be above the maximum run current reference value during said second predetermined period of time.

24. A system as in claim 23, further including the program steps of:
    defining a maximum allowable time period that said motor is allowed to remain continuously energized;
    measuring the time said motor is continuously energized;
    periodically comparing the time said motor is continuously energized with said maximum allowable time period; and
    deenergizing said motor when a time comparison step indicates said motor has been continuously energized for a period of time that is greater than said maximum allowable time period.

25. A system of detecting stall current in an energized electric motor, comprising:
    means for energizing said motor; and
    comparater means programmed to perform the steps of:
    periodically sampling the current drawn by said motor during a first predetermined period of time immediately following the commencement of energizing said motor;
    determining a peak current value from said samplings for said first predetermined period of time;
    multiplying said determined peak current value by a first predetermined fraction to derive a stall current reference value;
    continuing to periodically sample said current drawn by said motor during the time it is energized to determine run current values;
    defining a run current verification period of time immediately following said first predetermined period of time;
    providing a second predetermined fraction value according to the value of said peak current value;
    multiplying said peak current value by said second predetermined fraction value to determine a maximum run current reference value;
    comparing each run current value with said maximum run current reference value, during said run current verification period, to verify that the run current has dropped below said maximum run current reference value;
    deenergizing said motor if the run current value is determined to be above the maximum run current reference value during said second predetermined period of time;

comparing each run current value with said stall current reference value for the remainder of time said motor is energized; and deenergizing said motor when said compared run current values exceed said stall current reference value.

26. A system for detecting stall current in an energized electric motor, comprising:

means for energizing said motor; and means programmed to perform the steps of:

periodically sampling the current drawn by said motor during a first predetermined period of time immediately following the commencement of the energizing said motor;

identifying a predetermined number of the highest value of said samplings;

averaging a plurality of said highest values to determine a peak current value for said first predetermined period of time;

multiplying said determined peak current value by a first predetermined fraction to derive a stall current reference value;

continuing to periodically sample said current drawn by said motor during the time it is energized to determine run current values;

defining a run current verification period of time immediately following said first predetermined period of time;

providing a second predetermined fraction value according to the value of said peak current value;

multiplying said peak current value by said second predetermined fraction value to determine a maximum run current reference value;

comparing each run current value with said maximum run current reference value, during said run current verification period, to verify that the run current has dropped below said maximum run current reference value;

deenergizing said motor if the run current value is determined to be above the maximum run current reference value during said second predetermined period of time;

comparing each run current value with said stall current reference value for the remainder of time said motor is energized; and deenergizing said motor when said compared run current values exceed said stall current reference value.

27. A system for detecting stall current in an energized electric motor, comprising:

means for energizing said motor; and means programmed to perform the steps of:

periodically sampling the current drawn by said motor during a first predetermined period of time immediately following the commencement of energizing said motor;

determining a peak current value from said samplings for said first predetermined period of time;

multiplying said determined peak current value by a first predetermined fraction to derive a stall current reference value;

continuing to periodically sample said current drawn by said motor during the time it is energized to determine run current values;

establishing a maximum allowable time period that said motor is allowed to remain continuously energized;

comparing each run current value with said stall current reference value;

deenergizing said motor when said compared run current values exceed said stall current reference value measuring the time said motor is continuously energized;

periodically comparing the time said motor is continuously energized with said maximum allowable time period; and deenergizing said motor when a time comparison step indicates said motor has been continuously energized for a period of time that is greater than said maximum allowable time period.

* * * * *